US005387163A

United States Patent [19]

Sakamoto et al.

[11] Patent Number: 5,387,163

[45] Date of Patent: Feb. 7, 1995

[54] VERTICAL TYPE MULTI-CYLINDER INTERNAL COMBUSTION ENGINE

[75] Inventors: Osamu Sakamoto; Chitoshi Saito, both of Hamamatsu, Japan

[73] Assignee: Sanshin Kogyo Kabushiki Kaisha, Hamamatsu, Japan

[21] Appl. No.: 67,220

[22] Filed: May 26, 1993

[30] Foreign Application Priority Data

May 27, 1992 [JP] Japan ..................... 4-160344

[51] Int. Cl.[6] ..................... F16H 59/70

[52] U.S. Cl. ..................... 477/100; 477/111; 123/443

[58] Field of Search ..................... 123/443, 493; 477/100, 477/107, 111

[56] References Cited

U.S. PATENT DOCUMENTS

| | | | |
|---|---|---|---|
| 3,756,208 | 9/1973 | Toda et al. | 123/97 B |
| 4,056,931 | 11/1977 | Hata | 60/274 |
| 4,068,637 | 1/1978 | Takamiya | 123/119 A |
| 4,123,901 | 11/1978 | Masaki et al. | 60/277 |
| 4,353,208 | 10/1982 | Volker et al. | 60/299 |
| 4,735,046 | 4/1988 | Iwai | 60/295 |
| 4,965,997 | 10/1990 | Suzuki et al. | 66/310 |
| 5,050,453 | 9/1991 | Yamaguchi | 74/858 |
| 5,239,966 | 8/1993 | Yamagata et al. | 123/493 |
| 5,271,368 | 12/1993 | Fuji et al. | 123/493 |

FOREIGN PATENT DOCUMENTS 55-10043 1/1960 Japan .

*Primary Examiner*—Dirk Wright
*Attorney, Agent, or Firm*—Knobbe, Martens, Olson & Bear

[57] ABSTRACT

An outboard motor having vertically spaced cylinders and wherein exhaust emission control is provided by providing a leaner than normal fuel/air mixture to the lower cylinders under certain conditions. In addition, the device provides enrichment when the engine is operating at a below normal condition and also provides an engine speed reduction if the engine is operating at a temperature above a desired maximum temperature. Both three cylinder inline and V-6 embodiments are depicted.

26 Claims, 4 Drawing Sheets

VERTICAL TYPE MULTI-CYLINDER INTERNAL COMBUSTION ENGINE

BACKGROUND OF THE INVENTION

This invention relates to a vertical type multi-cylinder engine and more particularly to an improved system for improving the running characteristics and exhaust emission of such an engine.

As is well known, there is considerable effort to reduce the undesirable exhaust emissions of internal combustion engines. In certain particular types of applications, the effective exhaust emission control is quite difficult. One example of such an application is an outboard motor. Because of its extremely compact nature, it is very difficult to effectively treat the exhaust gases in the engine of an outboard motor.

Conventionally, the cylinders of the engine are disposed in a horizontal orientation so as to drive a vertically disposed crankshaft. The exhaust gases are conveyed from the cylinders of the engine downwardly by an exhaust pipe into an expansion chamber in the driveshaft housing. As a result of this compact construction, the exhaust pipe must have a relatively short length and the length between the outlet end of the exhaust pipe and the lower most cylinder is quite short. This can provide significant problems in connection with efficient exhaust emission control.

These problems are further complicated by the fact that outboard motors frequently run at a condition when the engine speed is actually below idle speed. That is, it is frequently the practice to run the outboard motor in a "trolling" condition and under this condition the speed of the engine is very low. This gives rise to difficulties in obtaining good scavenging and full burning of the fuel charge, particularly with two cycle engines, the commonly used power plant for outboard motors of this type.

It is, therefore, a principal object of this invention to provide an improved arrangement for an outboard motor that will insure that the exhaust gases can be effectively treated.

It is a further object of this invention to provide an improved control system and method for operating an outboard motor so as to insure that there is a minimum of unburned hydrocarbons in the exhaust gases, particularly under the difficult trolling condition.

SUMMARY OF THE INVENTION

This invention is adapted to be embodied in an internal combustion engine having at least two cylinders one positioned vertically above the other and driving a crankshaft that is rotatable about a vertical axis. An exhaust outlet is provided for each cylinder and an exhaust system receives the exhaust gases from the exhaust outlets and discharges the exhaust gases at a point below the cylinders. Charge forming means deliver a fuel air charge to each of the cylinders.

In accordance with an apparatus embodying the invention, means are provided that are responsive to a predetermined condition for supplying a leaner charge to the lower cylinder than the upper cylinder.

In accordance with a method of the invention, under certain running conditions of the engine a leaner charge is supplied by the charge forming means to the lower cylinder than the upper cylinder.

DETAILED DESCRIPTION OF THE PREFERRED EMBODIMENTS OF THE INVENTION

Figure 1:
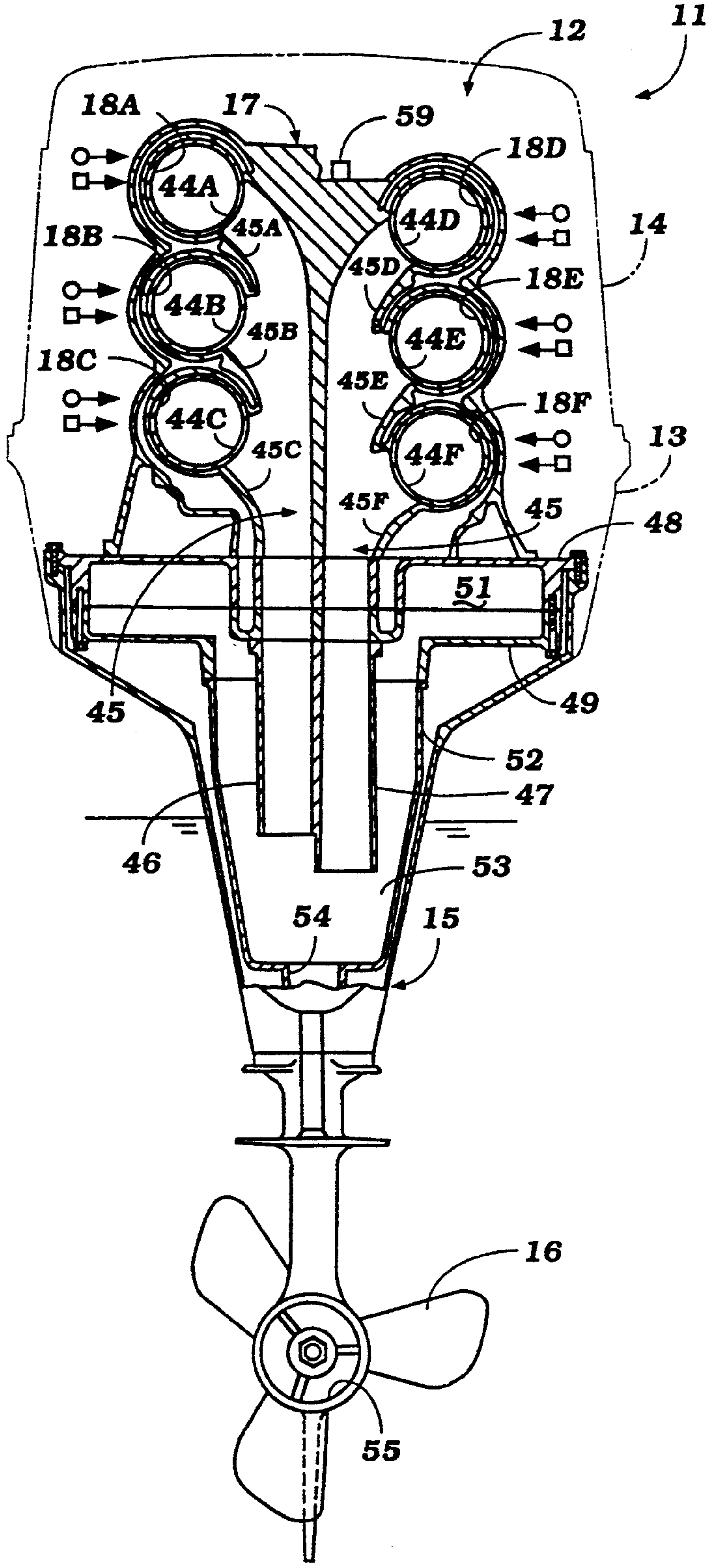
FIG. 1 is a rear elevational view of an outboard motor constructed in accordance with an embodiment of the invention, with a portion of the protective cowling shown in phantom and with a portion of the engine broken away so as to show the exhaust configuration.
Figure 2:
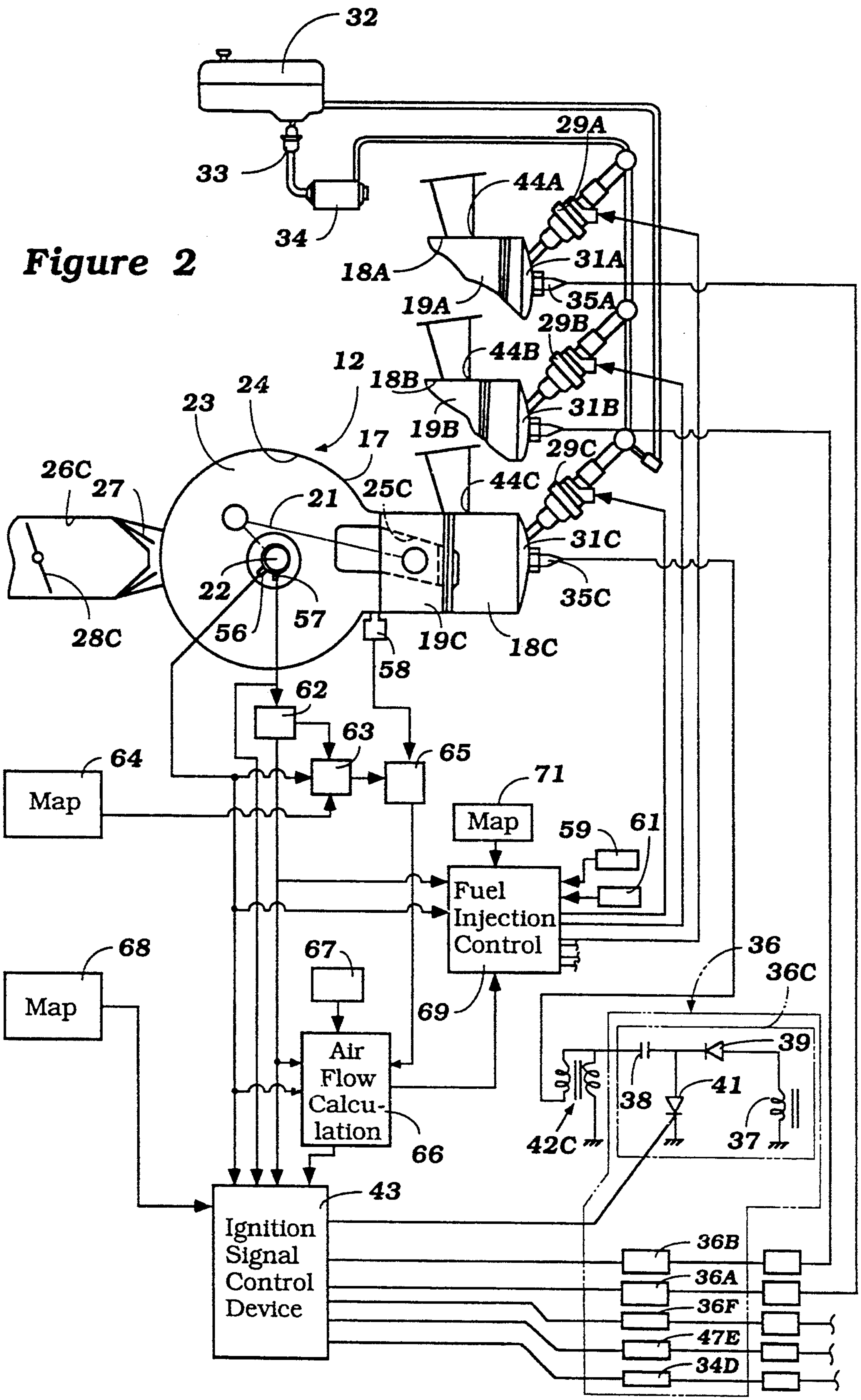
FIG. 2 is a partially schematic view showing the controls for the engine of this embodiment.

Referring now in detail to the drawings and initially primarily to FIGS. 1 and 2, an outboard motor constructed in accordance with a first embodiment of the invention is identified generally by the reference numeral 11. The invention deals primarily with the powering internal combustion engine of the outboard motor 11 and for that reason the description of the outboard motor 11 will be relatively general and any details of the outboard motor 11 per se which are not described can be considered to be conventional. Although the invention has utility in other applications than outboard motors, it has particular utility in outboard motors due to the fact that the cylinders of outboard motors are positioned vertically one above the other, the output shaft rotates about a vertically extending axis and there is a relatively small area for exhaust gas treatment.

The outboard motor 11 is comprised of a power head consisting of an internal combustion engine 12, some details of which also appear in FIG. 2, and a surrounding protective cowling, shown partially in phantom in FIG. 1 and comprised of a lower tray portion 13 and a removable upper main cowling portion 14.

A driveshaft housing and lower unit 15 depends from the tray 13 and the lower unit thereof contains a forward neutral reverse transmission driven by the output shaft of the engine 12 in a known manner for driving a propeller 16 and selected forward and reverse directions.

In this embodiment of the invention, the engine 12 is of the V-6 type and operates on the two stroke crankcase compression principal. As will become apparent, the invention can be employed in conjunction with engines having other numbers of cylinders and, in fact, with engines having rotary rather than reciprocating action. However, the invention has particular utility where the chambers of the engine are positioned vertically one above the other.

The engine 12 includes a cylinder block 17, which is shown schematically in FIG. 2, and which has a plurality of cylinder bores 18A, 18B, 18C aligned in one bank and a plurality of cylinder bores 18D, 18E and 18F aligned in another bank. These cylinder bores 18A through 18F are formed by liners that are pressed into the cylinder block in a well known manner. Pistons 19A, 19B, 19C, 19D, 19E and 19F are supported for reciprocation in each of the cylinder bores 18A through 18F. The pistons are connected by means of connecting rods 21 to a crankshaft 22 which is journaled for rotation about a vertically extending axis within a crankcase formed by the skirt of the cylinder block 17 and a crankcase member 23 that is affixed to the cylinder block 17 in a well known manner.

The crankcase member 23 and skirt of the cylinder block 17 form a plurality of respective crankcase chambers, one of which is indicated at 24C in FIG. 2 each of which communicates with a respective one of the cylinders bores 18A through 18F through respective scavenge passages, only one of which appears in the drawings and is identified by the reference numeral 25C, this being the scavenge passage associated with the cylinder bore 18C. As is well known, the scavenge passages 25 communicate the crankcase chambers 24 with the cylinder bores 18 as the pistons 19 reciprocate.

As aforenoted, the crankshaft 22 drives a driveshaft (not shown) that is rotatably journaled within the driveshaft housing 15 and which drives the forward neutral reverse transmission in the lower unit. This provides the final drive to the propeller 16 in a manner well known in this art.

An air charge is delivered to the crankcase chambers 24A through 24F from an induction system that includes an induction manifold having individual runners 26A through 26F which serve the respective crankcase chambers 24A through 24F. Reed type check valves 27A through 27F are disposed in each runner 26A through 26F for permitting the air charge to enter the respective crankcase chamber 24 but for precluding reverse flow when the charge is being compressed due to downward movement of the respective piston 19. Respective throttle valves 28A through 28F are positioned in each manifold runner 26A through 26F for controlling the speed of the engine in a well known manner. An air intake device including a silencer (not shown) is positioned within the protective cowling 13, 14 for admitting an air charge to the manifold runners 26.

As has been noted, the induction system for the engine 12 introduces only a pure air charge into the individual crankcase chambers 24. It is to be understood that fuel injectors may be provided in the manifold runners 26 for supplying a fuel/air charge or carburetors may be employed for supplying a fuel/air charge to the crankcase chambers 24. However, in the illustrated embodiments of the invention, the engine 12 is provided with direct cylinder fuel injection provided by individual fuel injectors 29A through 29F. Each fuel injector 29A through 29F is electrically operated and has a solenoid for opening and closing an injection valve so as to permit fuel to be sprayed into a respective combustion chamber 31A through 31F formed by each of the cylinder bores 18A through 18F, pistons 19A through 19F and a cylinder head (not shown) affixed to each cylinder bank.

Fuel is supplied to the fuel injectors 29 from a remotely positioned fuel tank 32 by a conduit system including an inline filter 33 and high pressure pump 34. In addition, a fuel pressure regulator (not shown) is provided for controlling the pressure of fuel supplied to the individual fuel injectors.

The charge which has thus been formed in the combustion chambers 31 is fired by respective spark plugs 35A through 35F each mounted in the respective cylinder head and having its gap projecting into the respective combustion chamber 31A through 31F. The spark plugs 35 are fired by an ignition circuit, indicated generally at 36 in FIG. 2. The ignition circuit 36 includes a plurality of individual firing circuits 36A through 36F with one of the circuits, that associated with the cylinder bore 18C, being shown in detail.

These firing circuits are of the SCR type and include a charging coil 37 of a flywheel magneto of the engine 12 which charges a charging capacitor 38 through a diode 39. An SCR 41 is provided for selectively discharging the capacitor 38 and inducing a high voltage in a respective spark coil 42A through 42F associated with each of the spark plugs 35A through 35F for firing the spark plugs in a well known manner in this art. The SCR's 41 of the individual ignition control circuits 36A through 36F are switched by an ignition signal control device, indicated generally by the reference numeral 43 and operating in a manner which will be described.

When the charge in the individual combustion chambers 31 is fired, it will burn and expand and drive the respective piston 19 downwardly so as to drive the crankshaft 22 in a well known manner. The burnt charge is discharged through a respective exhaust port 44A through 44F formed in the cylinders 18A through 18F. The exhaust ports 44A through 44F communicate with a pair of exhaust manifolds, indicated generally by the reference numerals 45 which are formed integrally in the cylinder block 17 in a side by side fashion. The exhaust manifolds 45 have individual runner sections 45A through 45F which communicate with the respective exhaust ports 44A through 44F and which form respective side by side collector sections into which the runners 45A through 45C and 45D through 45F communicate. Each manifold terminates in a respective exhaust pipe 46 and 47 which depend downwardly into the driveshaft housing 15.

It should be noted that the engine 17 is mounted on a spacer plate assembly that is comprised of an upper plate 48 and a lower plate 49 which are fixed to each other and which define an internal cavity 51 which forms in part an expansion chamber. The lower plate 49 is connected to a further inner shell 52 which depends into the driveshaft housing 15 and defines a further extension 53 of the expansion chamber with the portion 51 and into which the lower ends of the exhaust pipes 46 and 47 discharge. It should be noted that the lengths of the exhaust pipes 46 and 47 are such that they terminate at different vertical locations in the expansion chamber 51,53.

The exhaust gases are then discharged from the expansion chamber 51, 53 through a high speed exhaust gas discharge 54 formed at the lower end of the shell 52 and which communicates with a through the propeller hub high speed exhaust gas discharge opening 55. As is well known in this art, an above the water low speed exhaust gas discharge (not shown) is provided for discharging the exhaust gases from the expansion chamber 51, 53 when the associate watercraft is traveling at a low rate of speed and when the propeller discharge 55 is relatively deeply submerged.

It should be readily apparent that the described construction requires relatively short exhaust pipes 46 and 47 and the lowermost cylinders 18C and 18F do not accommodate a long exhaust gas flow path through which any hydrocarbons remaining in the exhaust gases can be fully combusted as with the upper cylinders 18A, 18B, 18D and 18E. This presents a particular problem when traveling at low speeds such as trolling wherein the speed of the engine 12 may be actually lower than the idle speed. An arrangement, now to be described is provided so as to provide a leaner than normal fuel/air mixture to the lower cylinders 18C and 18F under these conditions so as to reduce the emission of undesirable exhaust gases and particularly hydrocarbons. This system will now be described by particular reference to FIG. 2 and its control routine by reference to FIG. 3.

It should be noted that the control system, in addition to providing the aforenoted effect, also provides the necessary control for the firing of the spark plugs 35 and timing of injection and duration of the fuel injectors 29 in response to varying engine running conditions.

The control system for the fuel injectors 29 and spark plugs 35 includes a number of sensors which sense ambient conditions and engine running conditions. Although certain specific types of sensors will be described, it is to be understood that additional inputs of ambient and engine running conditions may be employed or other inputs may be substituted for those which are described. Such variations in the control parameters will be readily apparent to those skilled in the art.

The sensors include a basic crank angle detecting sensor 56, and pulser coil 57 that are mounted on the crankcase 25 in proximity to the crankshaft 22 and which indicate both the angular position of the crankshaft and its rotational speed. In addition, a crankcase pressure sensor 58 is provided in one or more of the crankcase chambers 24A through 24F for sensing the pressure in the crankcase chambers. It is well known that differences in crankcase pressure during a cycle are a very accurate indication of air flow to the engine.

Engine temperature is sensed by an engine temperature sensor 59 that is mounted in a suitable manner, preferably on the cylinder block 17 in proximity to the cooling jacket of the engine so as to provide an indication of actual engine temperature. Also, there is provided a shift position detector 61 which will sense the condition of the transmission, aforedescribed in the lower unit which drives the propeller 16. The shift condition sensor 61 in this embodiment provides an output signal indicative of when the transmission is in a neutral condition.

It has already been noted that the firing of the spark plugs is controlled by the spark control circuit 36 which is, in turn, controlled by the ignition signal control device 43. The ignition signal control device receives signals which are indicative both of engine speed, crankshaft rotational angle and air flow. The pulser coil 57 outputs its signal to an engine speed detector circuit 62 which counts the pulses in a given time period and provides a signal of engine speed to the ignition control device 43. In a same manner, the crank angle position detector 56 outputs a signal indicative of crank angle to the ignition signal control device 43.

The engine speed detector 62 also outputs a signal to a convertor 63 which receives also the crank angle signal from the sensor 56 and which determines from a map or memory 64 the relationship between engine speed and crank angle so as to control the outputs of the pressure sensor 58 through a control 65 so as to feed the crankcase pressure signals at the appropriate times to an air flow calculator 66 which also has a map or memory 67 so as to provide an output signal to the ignition signal control device 43 indicative of the amount of air flowing to the engine. The ignition control device 43 then processes these signals and compares them with a map contained in a memory 68 so as to calculate the appropriate engine timing for firing of the spark plugs 35 and thus controlling the SCR's 41 in the aforedescribed manner so as to fire the spark plugs 35 at the appropriate crank angle.

The duration and timing of the fuel injectors 29 is controlled by a fuel injection control, indicated schematically at 69 which receives signals from both the crankshaft position detector 56 and engine speed from the engine speed detector 62 as well as the air flow signal from the air flow calculator 66. In addition, the fuel injection control 69 also receives the engine temperature signal from the engine temperature sensor 59 and a signal from the shift position detector 61. Furthermore, an additional map or memory 71 is provided which permits the fuel injection control 69 to select the appropriate timing and duration of fuel injections. In addition to selecting the amount of fuel injection for normal running conditions, the fuel injection control also controls the amount of fuel injected to the lower most cylinders 18C and 18F so as to provide good exhaust emission control and the control routine for this is illustrated in FIG. 3 and will now be described by particular reference to that figure.

Figure 3:
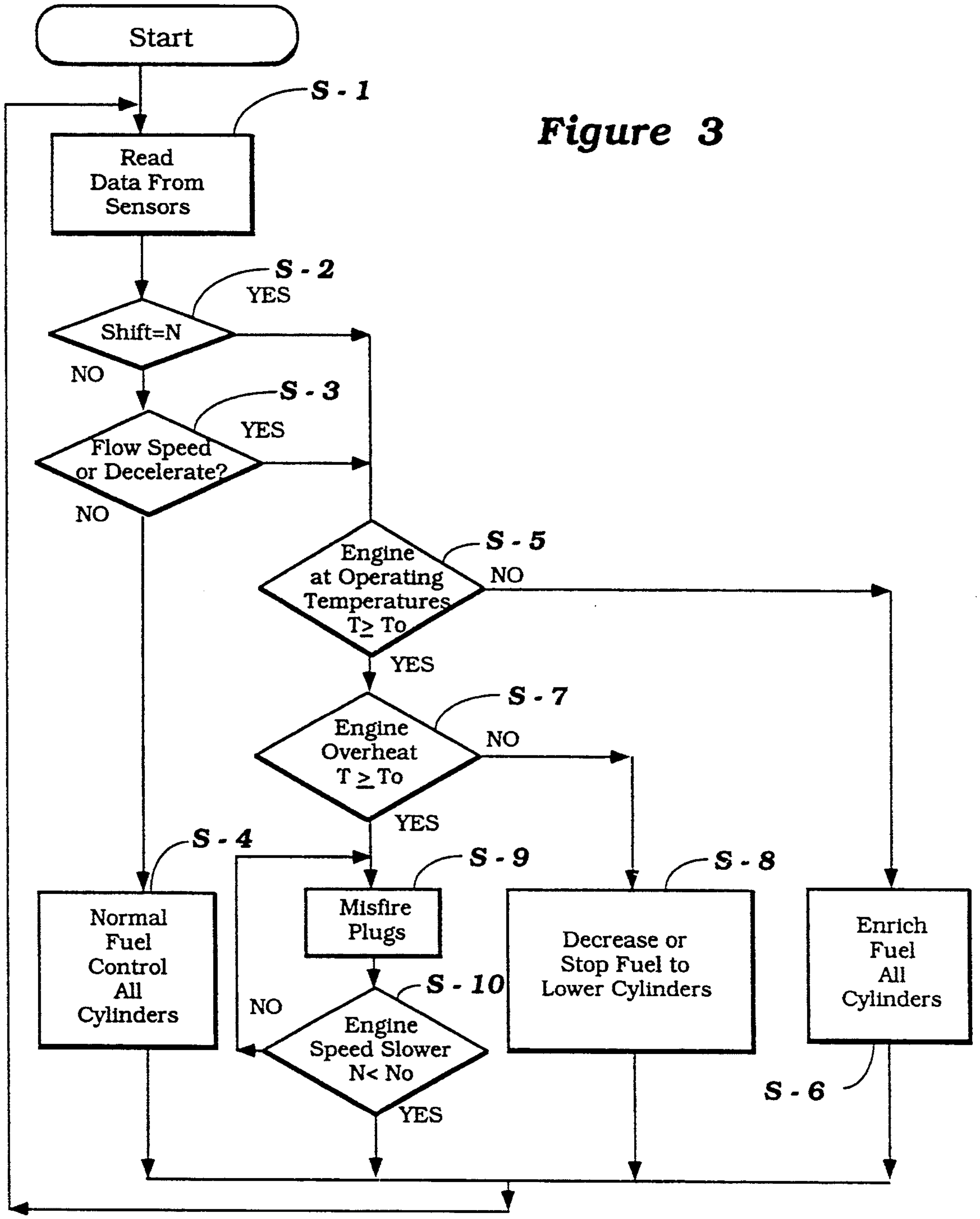
FIG. 3 is a block diagram for the control routine.

Referring now to FIG. 3, the basic program of the control routine will be described but before proceeding to a step by step analysis, the logic will be described generally. Basically, the system determines if the running conditions are such that the engine is operating under a normal condition when normal fuel/air ratio is acceptable. If so, this is provided. However, if it is detected that the engine is operating in conditions when protection for the engine is required, it moves to a control routine to provide certain controls, as will be described in detail.

The program starts and then moves to the Step S-1 to read data from all of the sensors as aforedescribed. The program then moves to the Step S-2 to determine if the transmission driving the propeller 16 is in neutral. If it is not, the program moves to the Step S-3 to determine if the engine is operating at low speed or decelerating. This can be done by making a comparison of the engine speed with a predetermined speed which is considered low speed and also to determine if the engine speed is decreasing.

If, at the Step S-3, it is determined that the engine is not operating at a low speed or decelerating, the program moves to the Step S-4 wherein the fuel injection control 69 provides normal fuel control to all cylinders.

If, at either the Step S-2 it has been determined that the transmission is in neutral or if at the Step S-3 it has been determined that the transmission is in a drive range and the engine is operating at either low speed or decelerating, the program moves to the alternate control routine and first to Step S-5 to determine if the engine is operating at the normal engine temperature ($T \geqq Te$). If at the Step S-5 it is determined that the engine is not yet operating at its normal engine temperature, it is assumed that the engine is in a warm-up mode and the program moves to the Step S-6 so as to provide enrichment fuel for all cylinders. The program then repeats back to the Step S-1.

If, at the Step S-5, it has been determined that the engine is operating at a temperature equal to or greater than the normal operating temperature ($T_e$) then the program then moves to the Step S-7 to determine if the engine is operating at an overheat temperature $T_o$. This overheat temperature is a temperature above normal engine operating temperature $T_e$ and a temperature when engine protection may be required.

If at the Step S-7 it is determined that the engine is not in an overheating mode but is thus operating either in neutral or at low speed or decelerating the program moves to the Step S-8 to initiate a control operation to effect emission control by either reducing the richness of the fuel/air mixture supplied to the lower most cylinders 18C and 18F or altogether cutting off the supply of fuel to these cylinders. As noted above, this will provide good assurance that hydrocarbons in the exhaust gases will be adequately controlled and also controls carbon monoxide (CO) emissions. After the procedure at Step S-8 has been initiated to decrease the richness or stop the fuel to the lower cylinders, the program repeats.

If at the Step S-7 it is determined that the engine is in an overheating mode ($T \geqq T_o$) the program then moves to another protective Step S-9 in which the engine speed is reduced by misfiring of the spark plugs 35. This is a well known method for reducing engine speed and because of this the detailed circuitry by which the engine speed is reduced is not described. After the spark plugs have been misfired at the Step S-9, the program moves to the Step S-10 to determine if the engine speed has been slowed to a lower engine speed ($N \leqq N_o$) where the engine will be protected. If the engine speed has not been reduced to the speed $N_o$, the program repeats back to the Step S-9 to continue or increase the misfiring of the spark plugs until the engine speed has been appropriately reduced. Once the engine speed has been appropriately reduced, the program then repeats back to the Step S-1.

From the described construction it should be readily apparent that the control for the fuel injection and ignition is extremely effective in insuring that exhaust emission control can be accomplished even in a compact outboard motor. In addition, the other protection routines described are accomplished. Although the device has been described in conjunction with direct cylinder injection, it should be readily apparent to those skilled in the art that this can be used also with engines having manifold or other types of fuel injection or also engines embodying carburetors and incorporating the appropriate arrangement for reducing the strength of the fuel/air mixture under certain conditions or enriching it under other conditions.

Figure 4:
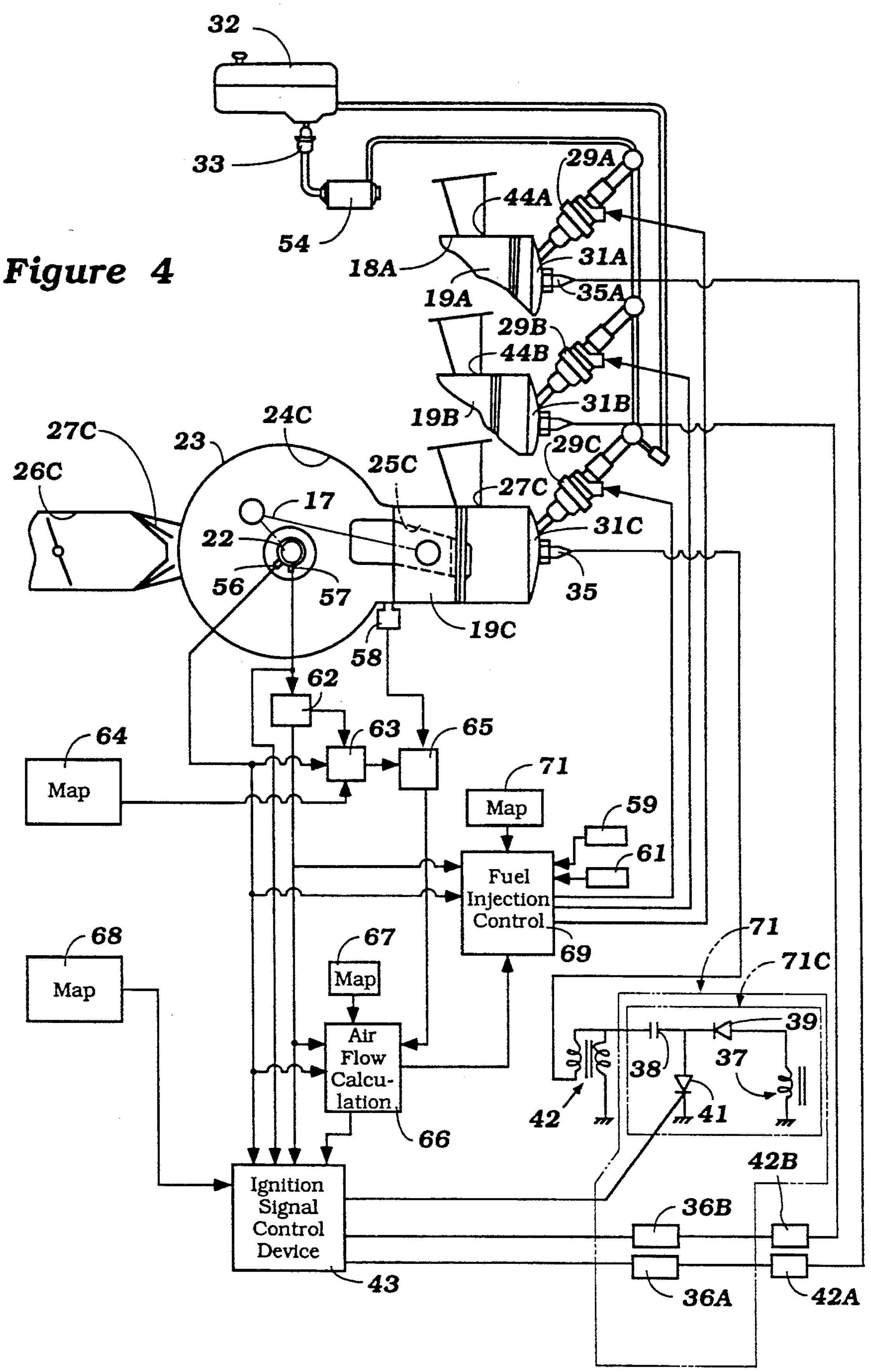
FIG. 4 is a schematic view, in part similar to FIG. 2 and shows another embodiment of the invention.

The embodiment of the invention as thus far described has been applied to a V-6 engine and FIG. 4 shows how the invention can be applied to an inline type three cylinder engine. Because the system is substantially the same, except for the reduced number of cylinders, the same reference numerals have been applied in this figure and further description is not believed to be necessary.

It is to be understood that the foregoing description is that of preferred embodiments of the invention and that various changes and modifications may be made without departing from the spirit and scope of the invention, as defined by the appended claims.

We claim:

1. An internal combustion engine having at least two cylinders one positioned vertically above the other and driving a crankshaft rotatable about a vertical axis, an exhaust outlet for each cylinder, an exhaust system for receiving the exhaust gases from said exhaust outlets and discharging the exhaust gases to a position below said cylinders, charge forming means for delivering a fuel charge to each of said cylinders, and means responsive to a predetermined condition for supplying a leaner charge to the lower cylinders than the upper cylinder.

2. An internal combustion engine as set forth in claim 1 wherein the engine operates on a two cycle crankcase compression principal.

3. An internal combustion engine as set forth in claim 2 wherein the charge forming means comprises a direct cylinder fuel injector.

4. An internal combustion engine as set forth in claim 1 wherein the predetermined condition is a low engine speed.

5. An internal combustion engine as set forth in claim 1 wherein the predetermined condition is a deceleration in engine speed.

6. An internal combustion engine as set forth in claim 5 wherein the predetermined condition also includes low engine speed.

7. An internal combustion engine as set forth in claim 6 wherein the leaner charge is supplied only if the engine is at a normal operating temperature.

8. An internal combustion engine as set forth in claim 7 wherein means are provided for determining if the engine is operating at a temperature higher than a predetermined temperature over normal engine temperature and further including means for reducing the speed of the engine if it is operating at a higher than desired temperature.

9. An internal combustion engine as set forth in claim 8 wherein the engine operates on a two cycle crankcase compression principal.

10. An internal combustion engine as set forth in claim 9 wherein the charge forming means comprises a direct cylinder fuel injector.

11. An internal combustion engine as set forth in claim 1 wherein there are at least three cylinders one positioned vertically above the other.

12. An internal combustion engine as set forth in claim 1 wherein the engine is provided in conjunction with an outboard motor and the engine is positioned in the power head of the outboard motor and the engine output shaft drives a drive shaft passing through a drive shaft housing positioned beneath the power head and including an expansion chamber into which the exhaust outlet discharges.

13. An internal combustion engine as set forth in claim 12 further including an expansion chamber in the drive shaft housing into which the exhaust outlet discharges.

14. An internal combustion engine as set forth in claim 13 further including transmission means for driving a propulsion device in the drive shaft housing and wherein the transmission means has a neutral condition wherein the propulsion device is not driven.

15. An internal combustion engine as set forth in claim 14 wherein the predetermined condition comprises shifting of the transmission into the neutral condition.

16. An internal combustion engine as set forth in claim 15 wherein the leaning of the charge is only done if the engine is operating at a normal temperature.

17. An internal combustion engine as set forth in claim 16 wherein the charge forming means supplies a richer than normal fuel/air charge to all of the cylinders if the engine is below normal operating temperature.

18. An internal combustion engine as set forth in claim 16 wherein the engine speed is reduced if the engine is operating at a temperature greater than a predetermined maximum desired operating temperature.

19. An internal combustion engine as set forth in claim 18 wherein the charge forming means supplies a richer than normal fuel/air charge to all of the cylinders if the engine is below normal operating temperature.

20. An internal combustion engine as set forth in claim 12 wherein the engine has a pair of cylinder banks each containing at least two cylinders one vertically positioned above the other.

21. A method of operating an internal combustion engine having at least two cylinders one positioned vertically above the other and driving a crankshaft rotatable about a vertical axis, an exhaust outlet for each cylinder, an exhaust system for receiving the exhaust gases from said exhaust outlets and discharging the exhaust gases to a position below said cylinders, charge forming means for delivering a fuel charge to each of said cylinders, said method comprising the steps of sensing a predetermined condition and supplying a leaner charge to the lower cylinders than the upper cylinder when the predetermined condtion is sensed.

22. A method as set forth in claim 21 wherein the predetermined condition is a low engine speed.

23. A method as set forth in claim 21 wherein the predetermined condition is a deceleration in engine speed.

24. A method as set forth in claim 23 wherein the predetermined condition also includes low engine speed.

25. A method as set forth in claim 24 wherein the leaner charge is supplied only if the engine is at a normal operating temperature.

26. A method as set forth in claim 25 further comprising the steps of determining if the engine is operating at a temperature higher than a predetermined temperature over normal engine temperature and reducing the speed of the engine if it is operating at a higher than desired temperature.

* * * * *